United States Patent [19]

Hillinger

[11] Patent Number: 5,388,741

[45] Date of Patent: Feb. 14, 1995

[54] TAPE-MEASURE USING AND HOLDER ASSEMBLY

[75] Inventor: George Hillinger, Beverly Hills, Calif.

[73] Assignee: Huei-Yen Liao, Taipei, Taiwan, Prov. of China

[21] Appl. No.: 173,888

[22] Filed: Dec. 27, 1993

[51] Int. Cl.⁶ .............................................. B65D 25/10
[52] U.S. Cl. ..................... 224/253; 224/904; 224/226; 224/227; 24/11 CC; 24/10 A; 206/349
[58] Field of Search ............... 224/253, 904, 226, 227, 224/242, 245, 240; 24/10 R, 11 CC, 10 A; 206/349, 214, 371, 224

[56] References Cited

U.S. PATENT DOCUMENTS

| | | | |
|---|---|---|---|
| 1,060,615 | 5/1913 | Metcalf | 24/11 CC |
| 1,610,535 | 12/1926 | Smith | 24/10 A |
| 3,294,298 | 12/1966 | Danielson | 224/253 |
| 5,100,037 | 3/1992 | Kopyta et al. | 224/245 |

Primary Examiner—Henry J. Recla
Assistant Examiner—Steven O. Douglas
Attorney, Agent, or Firm—Albert O. Cota

[57] ABSTRACT

An improved tape-measure using and holding assembly (10) that includes a tape measuring cavity (24) and an adjacent implement cavity (26). Into the cavity (24) is inserted and held a conventional tape measure (50) that includes a tape-release, slide-lock (52) and a spring-biased measuring tape (54). Into the cavity (26) may be inserted a variety of pencils, pens and other small implements used in the trade. The assembly (10) which is integrally and preferably made of a hard impact plastic has a right section (14) that includes a tape-release slot (14E) through which projects the tape-release slide-lock (52) and a tape-measure opening (14F) through which the measuring tape (54) maybe extended and retracted to allow tape measurements to be made while the tape measure (50) is securely held within the cavity (24). On the back surface of the back section (18) of the assembly (10), is located a pair of protrusions (181) having belt slots (18J) through which is inserted a waist belt. The assembly (10) features a light assembly (34) attached above the tape measuring opening (14F). When the light assembly (34) is activated, by pressing on a momentary-on switch (34F) located on a housing attached to the front section (14), a housing battery causes a light bulb (34B) to illuminate to allow the tape markings to be easily read in low-light areas.

11 Claims, 5 Drawing Sheets

TAPE-MEASURE USING AND HOLDER ASSEMBLY

TECHNICAL FIELD

The invention pertains to the general field of tape measuring holders, and more particularly to an improved tape measure holder that allows the tape to be used while still in the holder, that incorporates a light source that allows a measurement to be viewed in darkened and low-light areas and that includes a cavity into which pencils and the like can be stored.

BACKGROUND ART

The use and utility of tape measurers has long been a standard tool for various trades and crafts. Tape measurers incorporate a measuring tape made of flexible material that has imprinted various units of lengths. The measuring tape is typically enclosed within a rigid, square housing that allows the tape to be extracted to make a measurement. The housing includes an internal spring mechanisms that biases the measuring tape and automatically retracts the tape back into the housing after a measurement has been made and a tape-release slide-lock is activated.

To safeguard the placement and ease of use of the tape measure, it is held in a tape measure holder. The holder is typically made of a leather or plastic and includes on it backside a belt clip that is clipped to a waist belt or belt slot through which a belt is inserted. To use the tape measure, it is first removed from the holder, or measurement is taken, and thereafter the tape measure is returned to its holder. The utility of clips has been found to have problems in that after a period of time the resiliency of the clip wear out loosing its gripping power and thus, compromise the security of the holder and tape measure.

A search of the prior art did not disclose any tape measure holders that:

1. allow the tape measure to be extracted while still held within a holder that is attached to the waist and,
2. include a light source that allows measurements to be seen in low-light or darkened areas, and
3. includes an implement cavity that allows pencils, markers, tape and other implements used in the trade to be held and easily extracted.

Thus, no patents were found that read directly on the claims of the instant invention. However, the following U.S. patents were considered related:

| U.S. PAT. NO. | INVENTOR | ISSUED |
| --- | --- | --- |
| 5,100,037 | Kopyta et al | 31 March 1992 |
| 4,932,576 | Ashley | 12 June 1990 |
| 4,757,927 | Rutty | 19 July 1988 |
| 4,690,316 | Peterson | 1 September 1987 |
| 4,598,027 | Johnson | 1 July 1986 |

The U.S. Pat. No. 5,100,037 Kopyta et al. patent discloses a tape rule holder formed from two flat pieces of heavy duty leather. The back piece of the tape rule holder includes belt slots in its upper section. The front piece or pocket-forming member of the tape rule holder is configured with peripheral side areas and a bottom area, each defined by a fold line. When the front piece is attached to the back piece there is formed a tape rule pocket having a front wall, side walls and a bottom wall and the side wall present on their inner portion side pocket pressure detent ridges. A leather strap is affixed to the back piece and has a forwardly arched portion within the tape rule pocket to form an inner back pressure ridge. This ridge, together with the side detent ridges apply pressure to a tape rule inserted into the leather tape rule holder to grip and maintain the tape rule therein.

The U.S. Pat. No. 4,932,576 Ashely patent discloses a nail and screw pouch, and tool holder assembly. The assembly includes one or more slidable belt-attached pouch holders with slots through which a belt passes that is worn by the user. Each pouch holder, which may be of leather so as to be relatively stiff, has a pouch hanger member formed of a generally horizontal rigid bar or rail with a plurality of depending U-shaped sections. Each section supports and locates a clip from which a pouch or tool holder hangs.

The U.S. Pat. No. 4,757,927 Rutty patent discloses a holder for suspending a measuring rule to which is attached a spring clip having an inwardly declined deflectable tongue portion. The holder is in a flat configuration and is desired to be inserted over or upon a belt of the user. The holder is in a U-shaped configuration with an outer leg having a laterally extending slot. The slot is configured to receive the tongue portion of the spring clip and defines a narrow lower edge element about which the rule can swing freely, so as to minimize any tendency for inadvertent disassembly. The construction of the holder facilitates one-handed attachment and removal of the rule.

The U.S. Pat. No. 4,690,316 Peterson patent discloses an apparatus for providing quick release retention of work pieces. A receptor that is attachable to a user includes a mechanism for attaching the work piece to the receptor by contact. The receptor is provided with a guard structure to protect against accidental release, without inhibiting quick release when desired.

The U.S. Pat. No. 4,598,027 Johnson patent discloses a holster formed from a blank of resilient sheet material such as sheet steel or the like. The holster is dimensioned to provide a planar rear wall of a width slightly larger than that of the rear wall of the housing of the tape measure to be supported. Side walls of a thickness of the tape measure housing are formed extending from the edges of the rear wall. Front flaps are formed on the edges of each side wall with the front flaps dimensioned to permit the passage of a finger therebetween. A spring joint is formed between the rear wall and the side walls to permit the side walls to flex but biasing the side walls toward each other to frictionally retain a tape measure housing therebetween.

DISCLOSURE OF THE INVENTION

The improved tape measure using and holding assembly is designed to hold a tape measure of the type that includes a tape-release slide-lock and a spring-biased measuring tape. In its most basic form, the assembly consists of:

1. a left section having front, back and bottom edges,
2. a right section having front, back and bottom edges, a tape-release slot and a tape-measure opening,
3. a front section having a bottom edge, and left and right edges that are integrally formed with the front edges of the left and right sections,
4. a back section having a bottom edge, and left and right edges that are integrally formed with the back edges of the left and right sections. One its back surface is located a pair of protrusions each having belt slots therethrough. Through these belt slots is inserted a waist belt that holds the assembly in place.

5. a bottom section that integrally interfaces with the bottom edges of the left, right, front and back sections. The completed assembly forms a tape-measure cavity and an adjacent, smaller implement cavity. Into the tape-measure cavity is inserted and securely held the tape measure with its tape release slide-lock projecting through the tape-release slot and its measuring tape inserted through the tape-measure opening from when the tape can be extended and retracted while the tape measure is securely held within the tape-measure cavity. The implement cavity may be used to hold pencils, pens and other implements routinely used in the trade.

In addition to allowing a tape measure to be used while retained within the assembly attached to the waist, the assembly further includes a light assembly. This assembly consists of a combination light socket and hood that is attached just above the tape measure opening on the right section. The light socket includes a lift bulb that is shielded from above by the hood. On the front section of the assembly is located a battery and switch housing that houses a replacable battery and a push-button switch. When the switch is pushed inward, the battery energies the light bulb that then illuminates the tape to allow the tape marking to be easily read at night or in low-light areas.

In view of the above disclosure, it is the primary object of the invention to provide a tape-measure using and holding assembly that: 1) allows measurements to be taken while the tape measure is secured to the assembly, 2) includes an implement cavity into which may be inserted pencils, pens and other implements, and 3) includes a light assembly that on-demand, illuminates the measuring tape at a point where a measurement is being taken.

In addition to the primary object of the invention, it is also an object to produce a tape-measure using and holding assembly that;

can be easily constructed of various materials with a hard-impact plastic preferred, can be sized to accommodate tape measures having different lengths, and is cost effective from both a manufacturer and consumer points of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred embodiment that is designed to facilitate the use and increase the utility of a conventional tape measure 50 of the type that includes a spring-biased, extendable measuring tape 52 and a tape-release slide-lock 54. The preferred embodiment of the tape-measure holding assembly 10 as shown in FIGS. 1–11 is comprised of the following major elements; a left section 12, a right section 14, a front section 16, a back section 18, a bottom section 20, a partition slat 22, a belt clip 28 and a light assembly 34.

Figure 1:
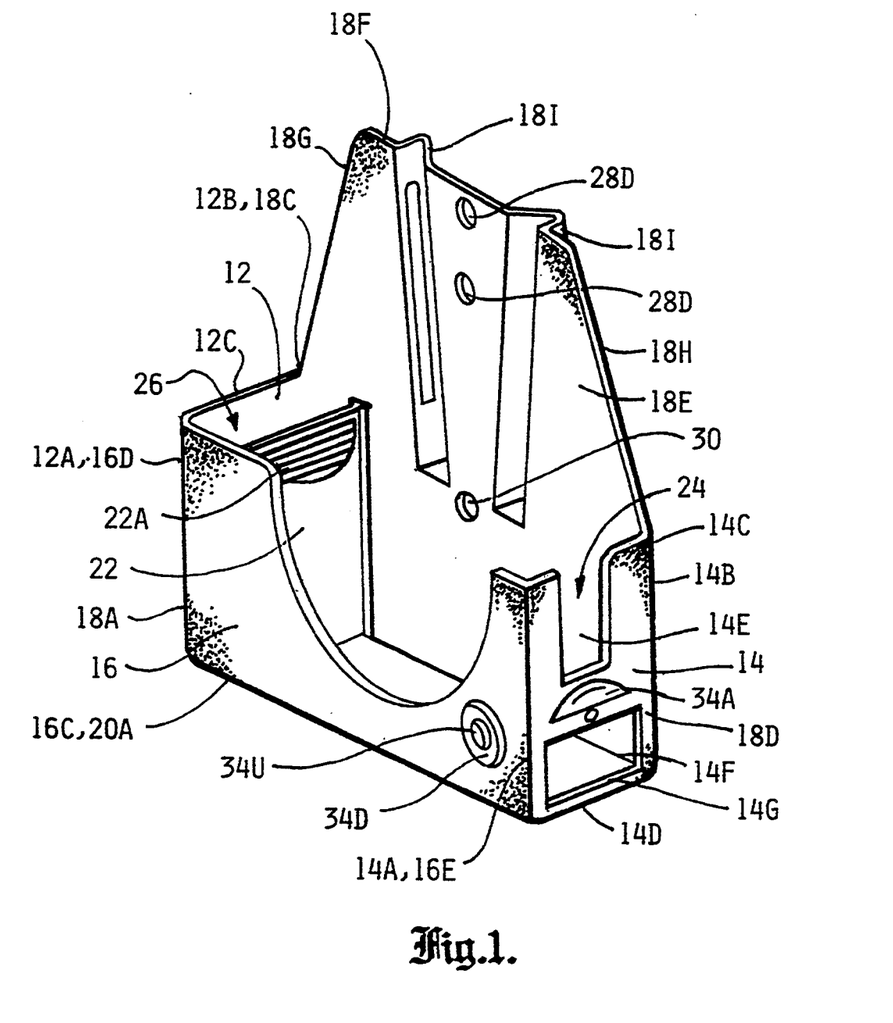
FIG. 1 is a perspective view of the tape-measure using and holding assembly as viewed from the right side.
Figures 2, 3:
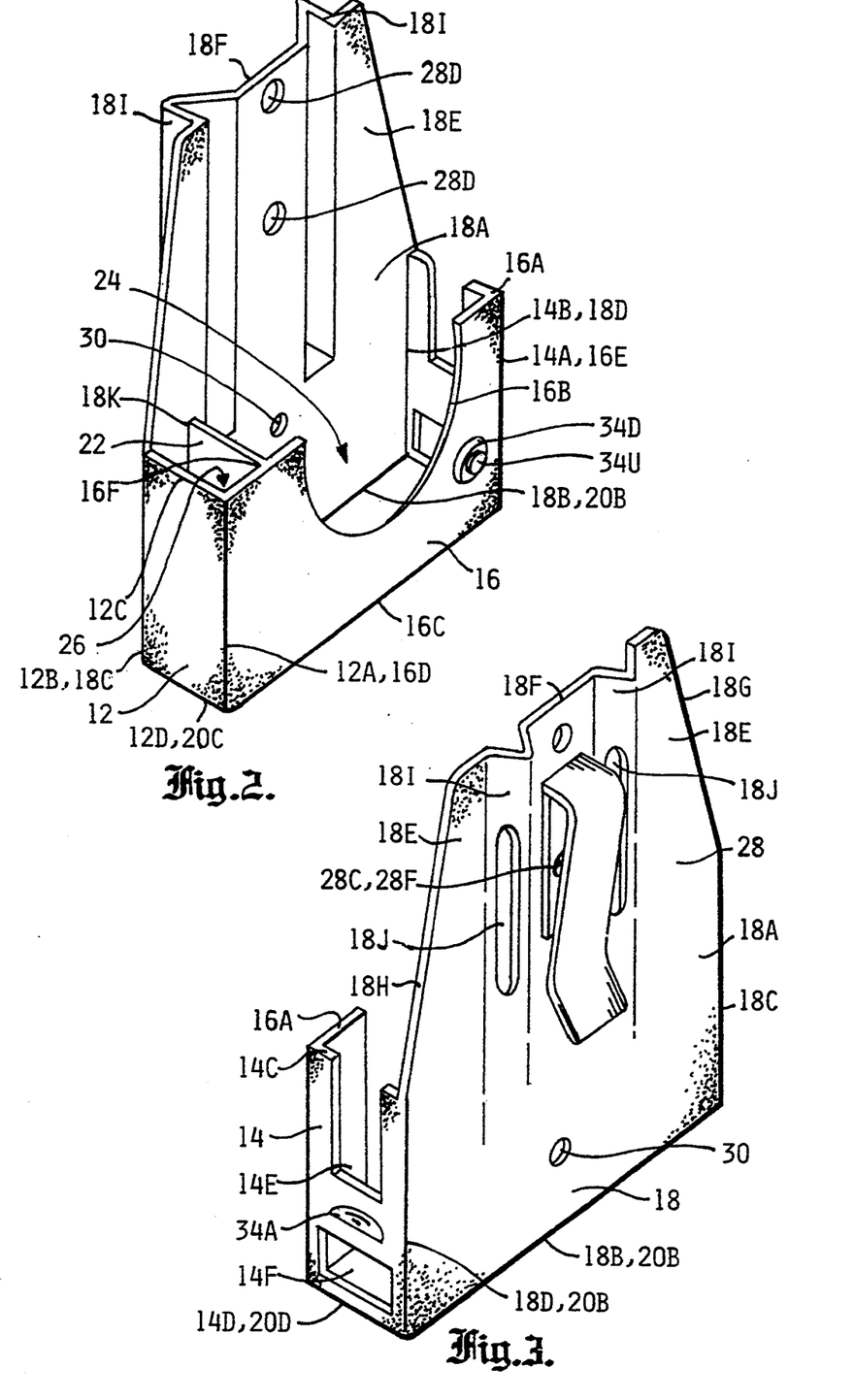
FIG. 2 is a perspective view of the assembly as viewed from the left side.
FIG. 3 is a perspective view of the assembly as viewed from the left side.

The primary holding structure of the assembly 10 as shown in FIGS. 1–3, consists of the left, right, front back and bottom sections. All sections are preferably integrally molded of a high impact plastic. However, the assembly may also be made of a flexible material such as leather.

The left section 12 as shown in FIG. 2, includes a front edge 12A, a back edge 12B, a top edge 12C and a bottom edge 12D. The right section 14 as shown in FIG. 1, likewise consists of a front edge 14A, a back edge 14B, a tope edge 14C and a bottom edge 14D. The right section also includes a tape release slot 14E that extends downward from the top edge 14C and a tape measure opening 14F that has a lower edge 14G, that is near the bottom edge 14D.

The front section 16 as also best shown in FIGS. 1 and 2, has a similar height as the left and right sections 12,14. This section has an upper edge 16A having an opening 16B that in the preferred embodiment has a semi-circular shape as also shown in FIG. 1. The front section 16 also has a lower edge 16C, a left edge 16D that abuts with front edge 12A of the front section 12 and a right edge 16E that abuts with the front edge 14A of the right section 14. On the inside surface of the front section 16 between the left edge 16D and the beginning of the opening 16B is located a vertical first channel 16F described further infra.

The back section 18 as best shown in FIG. 3, consists of an integral lower section 18A and on upper section 18E. The lower section has a lower edge 18B, and a left and right edge 18C, 18D. Both the left and right edges as shown in FIGS. 1 and 3, have a height that is substantially the same as the height of the back edges 12B,14B of the left and right sections 12,14 respectively. The integral upper section 18E also has an upper edge 18F and a left and right edge edges 18G,18H. The two edges 18G,18H, extend upward from the intersection with the left and right edges 18C,18D and slope inward to the upper edge 18F. With this configuration, the upper edge 18F of the upper section 18E has a width that is less than the lower edge 18B.

To complete the structure of the assembly 10, a bottom section 20 is employed. This bottom section as shown in FIGS. 1-3, has a front edge 20A that abuts with the lower edge 16C of the front section 16, a back edge 20B that abuts with the lower edge 18B of the back section 18, a left edge 20C that abuts with the bottom edge 12D of the left section 12 and a right edge 20D that abuts with the bottom edge 14D of the right section 14.

From the back surface of the back section 18 as also shown in FIGS. 1-3, are two belt protrusions 18I. These protrusions extend downward and outward from the upper edge 18F of the upper section 18E and stop near the top edges 12C,14C of the left and right sections 12,14. Each protrusion has in substantial alignment a vertical belt slot 18J therethrough which a user may insert a belt to hold the assembly 10 around a person's waist.

Figure 4:
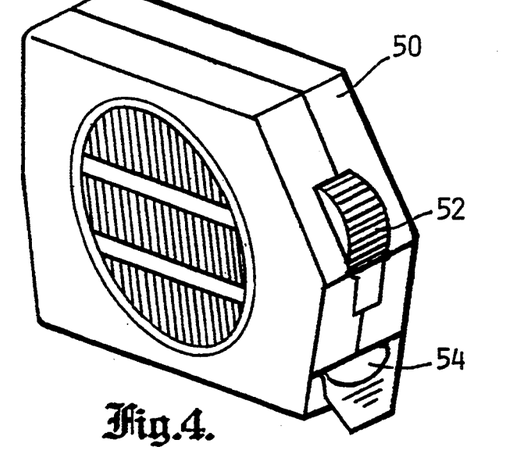
FIG. 4 is a perspective view of a typical tape measure that includes a tape-release slide-lock and a spring-biased extendable and retractable measuring tape.
Figure 5:
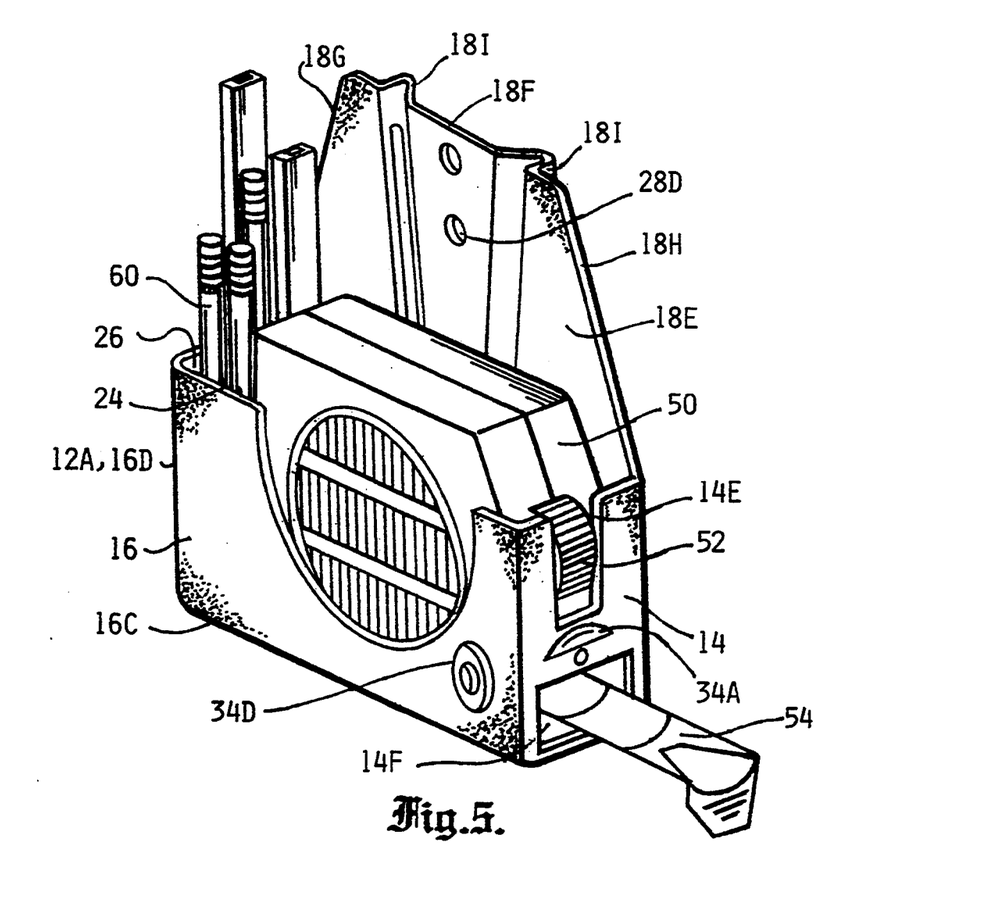
FIG. 5 is a perspective view of the assembly with a tape measure inserted and held within a tape measure cavity and with pencils and the like hold within an adjacent implement cavity.

The back section 18 also includes a second channel 18K located vertically and in alignment with the first channel 16F. Into these channels, is inserted a partition slot 22 with the partition slot inserted, a tape measure cavity 24 and an implement cavity 26 are formed as shown in FIGS. 1, 3 and 5. The tape measure cavity 24 has sides that border the partition slat 22 and the right section 14. Into this cavity 24 is inserted and held a tape measure 50 as shown in FIGS. 4 and 5, that includes a tape-release slide-lock 52 and a measuring tape 54. As shown in FIG. 5, the lock 52 projects through the tape-release slot 14E on the right section 14 and the tape 54 is extended through the tape-measure opening 14F also on the right section 14. With this arrangement, a user can use the tape measure 50 without having to remove it from the tape-measure holding assembly 10. Thus, saving time and a potential loss of a tape measure since the tape measure is always securely maintained within the assembly 10. The implement cavity 26 can be used to store pencils 60, paper and other implements that are used in the trade.

As also shown in FIG. 1, the partition slot 22 may include as serrated gripping surface allows the least one upper side. This gripping surface 22A on at slat to be easily removed when a wider tape measure 50 is to be inserted into the tape-measure cavity 24 (not shown) that extends from the left section 12 to the right section 14.

The back section 18 can also be made to incorporate a belt clip 28 and a tape measure attachment bore 30.

Figure 6:
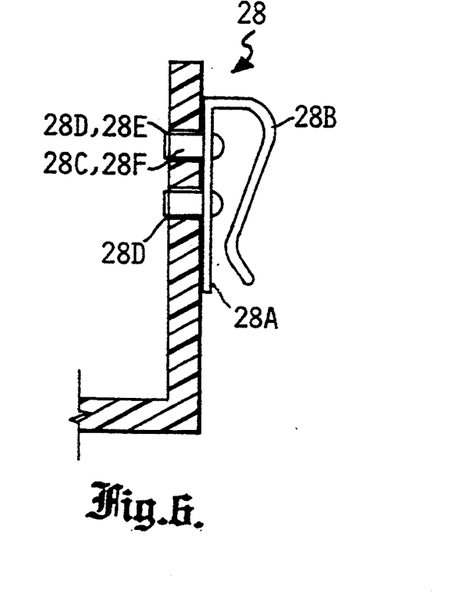
FIG. 6 is a side elevational view of the assembly showing the location and attachment means for a belt clip.

The belt clip 28 as shown in FIGS. 3 and 6, consists of an inward section 28A and an outward section 28B. The inward section is centrally and vertically attached, by an attachment means 28C, to the back surface of the back section 18 between the two belt protrusions 18I. Preferably, the belt clip attachment means 28C consists of having at least one belt-clip bore 28D substantially centered between the belt protrusions 18I as best shown in FIG. 2. Likewise, the inward section 28A of the belt clip 28 is made with at least one complimentary clip bore 28E. Through the bore(s) 28D,28E is inserted, a rivet 28F to hold the belt clip in place as best shown in FIG. 6.

Figure 7:
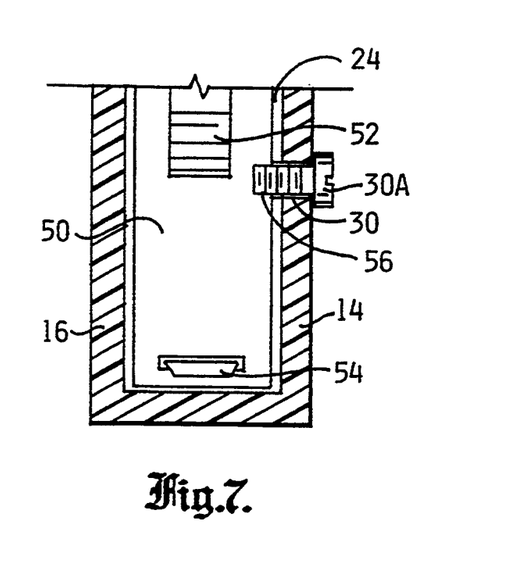
FIG. 7 is a side elevational view of an assembly that has a tape measure attached by means of a tape measure bolt inserted through a tape measure attachment bore and a threaded bore on the back of the tape measure.
Figure 8:
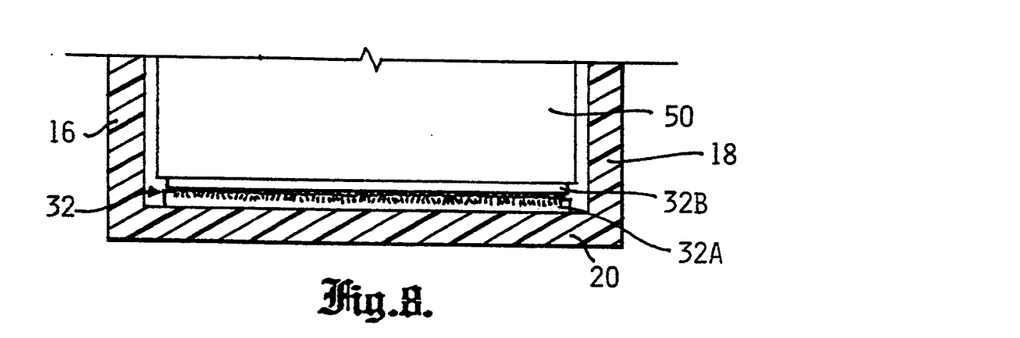
FIG. 8 is a side elevational view showing a tape measure held to the bottom surface of the assemblies bottom section by means of a hook and loop fastener.

The tape measure 50 in some designs, includes on its back surface a threaded bore 56 as shown in FIG. 7. To utilize this bore to hold the tape measure in place within the tape measure cavity 24, a tape measure attachment bore 30 is centrally located therethrough in the back section 18 as shown in FIGS. 3 and 7. Through this bore 30 is inserted, a tape measure bolt 30A that is sized to be threaded into the threaded bore 56 to thus secure the tape measure 50 to the tape-measure holding assembly 10. Alternatively, as shown in FIG. 8, a hook and loop fastener 32 may be used to add further holding security to the tape measure 50. In this case, a strip of a hook fastener 32A is attached to the upper surface of the bottom section 20. On the bottom surface of the tape measure 50 is then attached a complementary strip of a loop fastener 32B. When the hook and loop fastener interface, the tape measure 50 is securely held in place within the cavity 24.

Figure 9:
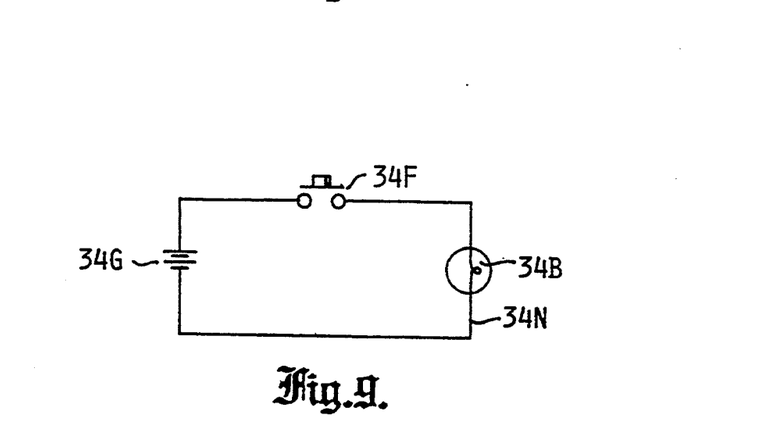
FIG. 9 is a schematic diagram of the light assembly.
Figure 10:
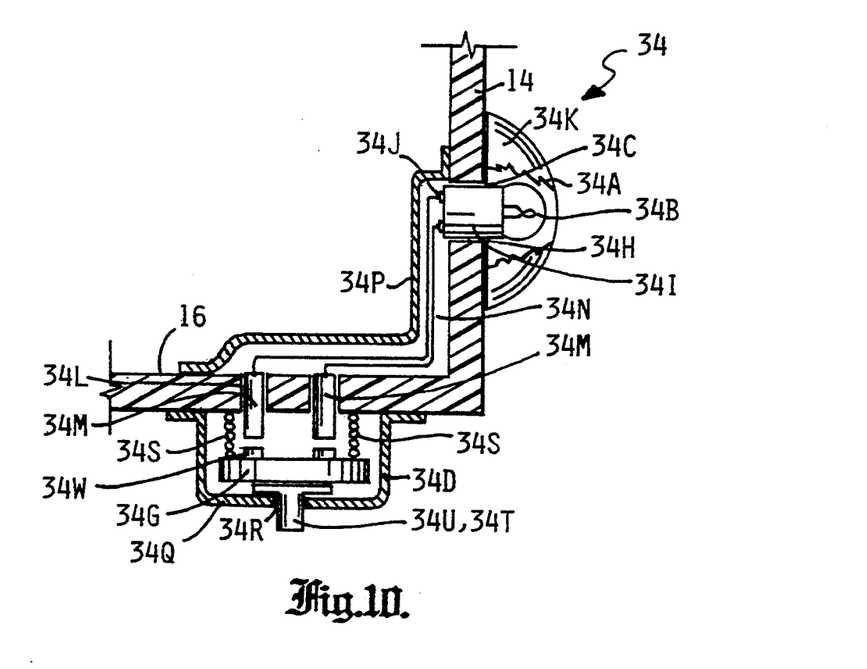
FIG. 10 is a top view showing the attachment of the light socket and hood, the battery the switch housing and the electrical conductors.
Figure 11:
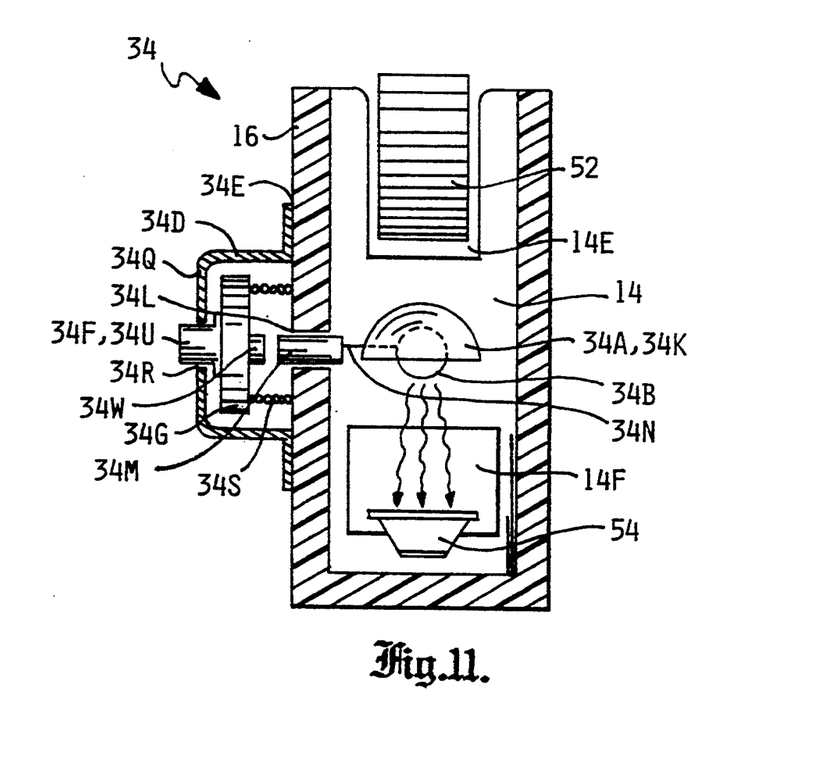
FIG. 11 is a front view of the light assembly.

The final element that adds utility to the tape measure holding assembly 10 is the light assembly 34. In its basic form, the light assembly as shown in FIGS. 9-11, consists of a combination light socket and hood 34A where into the light socket is inserted a light bulb 34B. The light socket and hook are then attached by an attachment means 34C to the right section 14 between the tape-release slot 14E and the tape measure opening 14F as shown in FIGS. 1 and 5. The assembly 34 also includes an enclosed battery and switch housing 34D that is attached by an attachment means 34E to the front surface of the front section 16 near its right edge 16E as shown in FIG. 1. The housing 34D encloses a momentary-ON switch 34F and a battery 34G that is electrically connected to the switch 34F. When the switch 34F is depressed, the battery 34G energizes the light bulb 34B.

The details of the implementation of the light assembly 34 can be accomplished by referring to FIGS. 10 and 11. In this implementation, the right section 14 of the assembly 10 includes a light socket and hook bore 34H therethrough that is located between the tape-release slot 14E and the tape-measure opening 14F. The light socket section 34I of the light socket and hood 34A includes on its back end, a pair of electrical contacts 34J. The socket section 34I is inserted into the light socket and hood bore 34H and held therein by an attachment means 34C such as an adhesive. With the socket section 34I attached, the hood section 34K extends outward away from the front surface of the right section 14 with the hood covering the upper portion of the light bulb 34B protruding from the light socket section 34I.

The front section 16 of the assembly 10 has a pair of battery contact bored 34L therethrough substantially on the same plane as the light socket and hood bore 34H. Into these bores, is attached by an attachment means 34C, a pair of battery-contact rods 34M. These rods as shown in FIGS. 10 and 11, have back ends that are substantially flush with the back surface of the front section 16 and front ends that project outward from the front surface. Between the back ends of the battery-contact rods 34M and the electrical contacts 34J on the back end of the light socket 34I is connected a pair of electrical conductors 34N. As shown best in FIG. 10, the conductors are laid flat against the back surfaces of the right section 14 and front section 16. To prevent an electrical short, a non conductive tape 34P can be attached over the battery contact rods 34M, the electrical conductors 34N and electrical contacts 34J as shown in FIG. 10.

The final component comprising the light assembly 34 is the battery and switch housing 34D that is attached to the front surface of the front section 16 by an attachment means 34E as shown in FIGS. 10 and 11. The housing 34D has a front plate 34Q that has therethrough a switch bore 34R. Within the housing 34D is located a compression spring 34S and a switch plunger 34T that includes a button section 34U that projects through the switch bore 34R on the front plate 34Q. Between the spring 34S and the back surface of the switch plunger 34J is located replacable battery 34G. The battery has a pair of electrical contacts 34W that make contact with the front ends of the battery-contact rods 34M. When the contact is made, the light bulb 34B illuminates to allow the markings on the measuring tape to be easily and conveniently read.

While the invention has been described in complete detail and pictorially shown in the accompanying drawings, it is not to be limited to such details, since many changes and modifications may be made in the invention without departing from the spirit and the scope thereof. Hence, it is described to cover any and all modifications and forms which may come within the language and scope of the appended claims.

I claim:

1. An improved tape-measure and implements using and holding assembly comprising:
    a) a left section having front, back and bottom edges,
    b) a right section having front, back and bottom edges, a tape-release slot and a tape-measure opening,
    c) a front section having a top edge, a bottom edge, and left and right edges that are integrally formed with the front edges of said left and right sections,
    d) a back section having a bottom edge, and left and right edges that are integrally formed with the back edges of said left and right sections, and having on its back surface a pair of protrusions each having belt slots therethrough,
    e) a bottom section having upper and lower surfaces that integrally interfaces with the bottom edges of said left, right, front and back sections, and
    f) a partition slat that interfaces with said front and back sections, wherein said assembly is sized to form a tape-measure holding cavity and an adjacent implements holding cavity, wherein a tape measure having an extendable measuring tape and a tape-release slide-lock is insertable into said tape-measure cavity such that the slide-lock projects through the tape-release slot and the extendable measuring tape is extendable and retractable through the tape-measure opening, and pencils, pens and other elongated implements used in the carpentry trade are insertable into said implement cavity.

2. The assembly as specified in claim 1 wherein said front section further having an opening that projects downward from said top edge.

3. The assembly as specified in claim 2 wherein said opening has a semi-circular shape.

4. The assembly as specified in claim 1 wherein said implement cavity is constructed by having:
    a) a first channel located vertically between the left edge and the opening of said front section, and
    b) a second channel located vertically on said back section in alignment with the first channel, wherein said partition slat is insertable into the first and second channels.

5. The assembly as specified in claim 4 wherein said partition slat further comprises serrated gripping surface on at least one upper side thereof wherein the gripping surface allows said slat to be removed when a wider tape measure is to be inserted into the tape-measure cavity.

6. The assembly as specified in claim 1 further comprising a belt clip having an inward section and an outward section, wherein the inward section is centrally and vertically attached, by an attachment means, to the back surface of said back section between the pair of protrusions.

7. The assembly as specified in claim 6 wherein said belt clip attachment means comprises:
    a) at least one belt-clip bore substantially centered between said belt protrusions,
    b) at least one clip bore located on the inward section of said belt-clip, and
    c) at least one rivet inserted into the at least one belt-clip bore and clip bore.

8. The assembly as specified in claim 1 further comprising a light assembly comprising:
    a) a combination light socket and hood, where into the light socket is inserted a light bulb, and the light socket and hood is attached by an attachment means, to said right section between the tape-release slot and the tape-measure opening, and
    b) an enclosed battery and switch housing attached to the front surface of said front section by an attachment means, where said housing encloses a momentary-on switch and battery that is electrically connected to the switch, such that when said switch is depressed, the battery energizes the light bulb which then is capable of illuminating incremental markings on an extended measuring tape.

9. The assembly as specified in claim 8 further comprises:
    a) a light socket and hood bore in said right section located between the tape-release slot and the tape-measured opening, wherein the light socket includes a pair of electrical contacts, and wherein the socket is inserted into the light socket and hood bore and held therein by said attachment means, such that when the socket is attached, the hood section extends outward away from the front surface of the right section with the hood covering the upper portion of the light bulb,
    b) a pair of battery-contact bores in the front section wherein a pair of battery-contact rods are attached such that said rods have back ends that are substantially flush with the back surface of said front section and front ends that project outward from the front surface of said front section,
    c) a pair of electrical conductors connected between the electrical contacts on the back end of the light socket section and the contacts on the back end of the battery rods,
    d) an enclosed battery and switch housing attached to the front surface of said front section wherein the housing has a front plate having a switch bore therethrough,
    e) a compression spring located within the housing,
    f) a switch plunger located within said housing and having a button section that projects through the switch bore on said front plate, and
    g) a battery located within the housing between the spring and the back surface of the switch plunger, with the battery having a pair of electrical contacts that make contact with the front ends of the battery-contact rods, wherein when contact is made, the light bulb is illuminated to.

10. The assembly as specified in claim 1 wherein said back section further having a tape-measure attachment bore centrally located therethrough, where into said tape-measure attachment bore is inserted a tape measure bolt that is sized to be threaded into a threaded bore located on the back surface of some models of said tape measure, such that, said tape measure is secured to said tape-measure holding assembly.

11. The assembly as specified in claim 1 further comprising a strip of a hook fastener attached to the upper surface of said bottom section, wherein said hook strip interfaces with a strip of loop fastener, that is attached to a bottom surface of said tape measure such that when the hook and loop fastener interface, the tape measuring is securely held in place.

\* \* \* \* \*